(12) United States Patent
Szilagyi

(10) Patent No.: US 8,632,260 B2
(45) Date of Patent: Jan. 21, 2014

(54) STRAIN RELIEF SYSTEM

(75) Inventor: B. Daniel Szilagyi, Naperville, IL (US)

(73) Assignee: Molex Incorporated, Lisle, IL (US)

(*) Notice: Subject to any disclaimer, the term of this patent is extended or adjusted under 35 U.S.C. 154(b) by 540 days.

(21) Appl. No.: 12/523,204

(22) PCT Filed: Jan. 15, 2007

(86) PCT No.: PCT/US2007/060540
§ 371 (c)(1),
(2), (4) Date: Feb. 24, 2010

(87) PCT Pub. No.: WO2008/088550
PCT Pub. Date: Jul. 24, 2008

(65) Prior Publication Data
US 2010/0247041 A1 Sep. 30, 2010

(51) Int. Cl.
*G02B 6/00* (2006.01)
*G02B 6/36* (2006.01)

(52) U.S. Cl.
USPC .................................. 385/88; 385/147

(58) Field of Classification Search
USPC ............................. 385/86, 88, 147
See application file for complete search history.

(56) References Cited

U.S. PATENT DOCUMENTS

2002/0141723 A1* 10/2002 Kent et al. .................. 385/136
2004/0014352 A1* 1/2004 Boemmel et al. ........... 439/445

FOREIGN PATENT DOCUMENTS

EP 1245977 10/2002
WO PCT/IB2001/001551 3/2002
WO PCT/EP2003/050637 4/2004

OTHER PUBLICATIONS

International Search Report and Written Opinion for PCT Patent Application No. PCT/US2007/060540, issued on Dec. 6, 2007.

* cited by examiner

*Primary Examiner* — Akm Enayet Ullah
(74) *Attorney, Agent, or Firm* — Timothy M. Morella

(57) ABSTRACT

A bend limiting system (strain relief (200)) that may be retrofit onto a cable connector (142). The bend limiting system includes a latching ring (102) configured to fit over the cable connector's mating face so that the bend limiting system may be placed into position after the connector is connected to another device. The bend limiter (200) includes three sections. These sections include a latching ring (202) in the front, an elongated cable guide (204) in the middle and a cable retainer (206) at the end. The latching ring portion (202) is of a generally circular shape to engage the mating face of a round complementary connector.

6 Claims, 5 Drawing Sheets

STRAIN RELIEF SYSTEM

FIELD OF THE INVENTION

This invention generally relates to cable connectors and, more particularly, to a strain relief system for connectors such as optical fiber connectors.

BACKGROUND OF THE INVENTION

Connectors are used for joining light-transmitting optical fiber cables to transmitter devices, receiver devices or to other cables. Optical fiber cables are somewhat delicate in that they can be bent or kinked and damage or destroy the interior buffered fiber of the cable. Therefore, as an optical fiber cable projects away from a connection, it is important that the fiber project in a manner that will not overstress or kink the fiber. Overstressing or kinking can interfere with the signal transmitting capabilities of the fiber.

Typically, the best condition for an optical fiber cable is to project straight away from its connection. However, it is not always possible to extend the cable in a straight line, particularly when the cable is used in compact environments. For example, connections are made to transceiver devices located at the rear of a computer and toward a rear wall. This requires routing or dressing the cable at an angle away from its connection, sometimes a severe angle to the plane of the connection.

In view of the problems identified above and to satisfy various packaging requirements, fiber optic connectors often are provided with right angle boots projecting from the rear of the connectors to maintain the terminated optical fiber cables in smooth angles projecting from the connectors. The boots prevent overstressing or kinking of the buffered fiber and provide an improved strain relief for the cables as the cables are maintained in minimum bend radius parameters. Sometimes connectors are provided with right angle boots that rotate about the longitudinal connector axes to different angles to accommodate different packaging/dressing requirements.

However, a particular disadvantage of most known right-angled booted connectors is that the boots must be placed into position on the cable before the cable is attached to the other device and before the cable is routed to its ultimate destination. This causes problems in routing the cable through ductwork or conduit. In addition, further rerouting of the cable is difficult with the boots attached.

DESCRIPTION OF THE DRAWINGS

The features of the bend limiting system described herein, which are believed to be novel, are set forth with particularity in the appended claims. The bend limiting system, together with its objects and the advantages thereof, may be best understood by reference to the following description taken in conjunction with the accompanying drawings, in which like reference numerals identify like elements in the figures and in which:

FIG. 5 is a front perspective view of the described fiber optic bend limiter system in accordance with a second embodiment;

DETAILED DESCRIPTION

In order to address the need for reducing or eliminating damage to delicate optical fibers and yet allowing for the convenient routing of cables, strain relief of fiber optic cables is accomplished as follows: A bend limiting system, which may be retrofit onto a cable connector, is installed over the mating face of the connector that connects to another cable or device. Because of the ability of the bend limiting system to be retrofit onto connectors at any time, the bend limiter may be placed into position after the cable has been routed and either before or after the connector is installed into the end device.

A particular advantage of the present system is that a cable installer or end user is able to easily and quickly route and reroute cabling through ductwork and conduit without worrying that the bend limiter will potentially snag or get stuck to the end of the conduit or become entangled with other cables.

An additional advantage of the present bend limiter is that in certain configurations it may be removed or reattached as necessary even when the cable is connected to an end device or after the cable has been rerouted. Because the bend limiter system is retrofittable, the need for the installer or end user to disconnect the cable is eliminated, which helps reduce or eliminate service disruptions. Unnecessary mating and demating cycles that possibly could damage the end faces of the fiber are also eliminated.

Still another advantage of the present bend limiter is that in a particular configuration, it may be retrofit onto a connector that normally would be too large to fit through the opening of a standard bend limiter.

Figure 1:
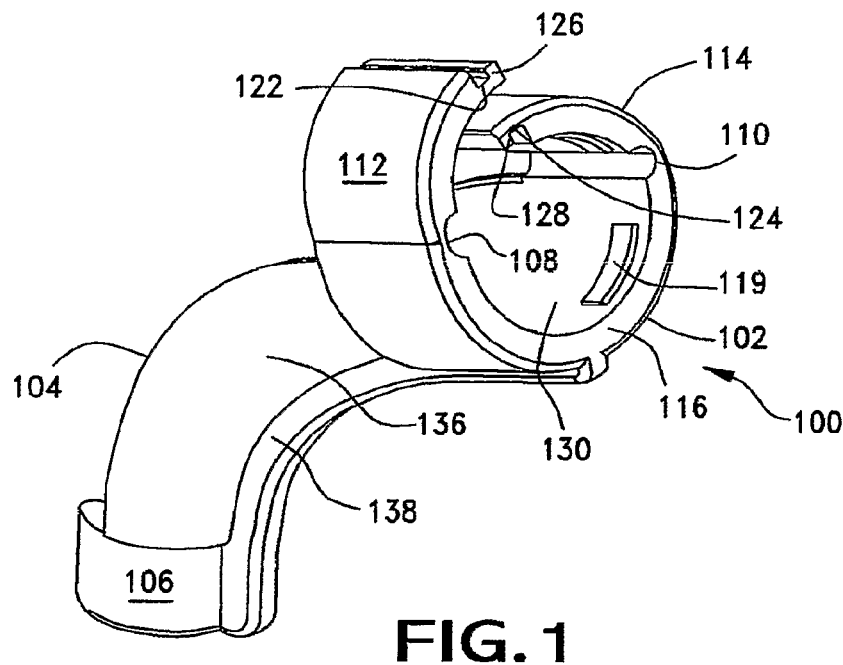
FIG. 1 is a front perspective view of the described fiber optic bend limiter system in an open position in accordance with a first embodiment.
Figure 2:
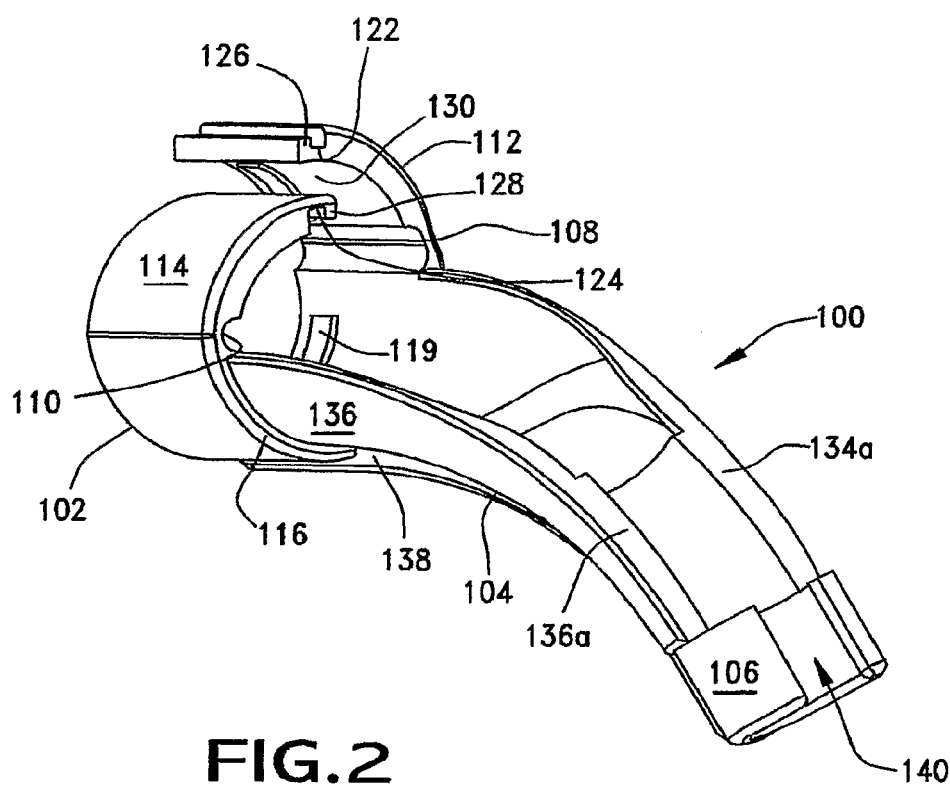
FIG. 2 is a rear perspective view of the described fiber optic bend limiter system of FIG. 1.

Turning now to FIGS. 1 and 2, a first aspect of the exemplary bend limiting system, or strain relief, 100 is shown in greater detail. The bend limiter 100 generally includes three sections. These sections include a latching ring 102 in the front, an elongated cable guide 104 in the middle and a cable retainer 106 at the end. The latching ring portion 102 is of a generally circular shape to engage the mating face of a round complementary connector. The shape of the latching ring 102 may be varied as needed depending on the shape of the connector that latching ring 102 is designed to engage.

In an exemplary embodiment, the latching ring 102 is formed as a single piece assembly, having a pair of separable locking arms 112, 114 and a base 116 that is formed as part of the cable guide 104. The locking arms 112, 114 are connected to either side of the base 116 via notched portions 108, 110. Each of the locking arms 112, 114 includes features that are used to form a latching system to fasten the arms together around the cable connector.

The latching system includes interlocking L-shaped connecting members on each of the locking arms 112, 114. Each of the L-shaped connecting members is configured with a trench 122, 124 and foot 126, 128 running along the length of the end of each arm.

The notches 108, 110, which are formed on either the inside or outside of the latching ring 102 and join the locking arms 112, 114 to the base 116, operate as hinges to enable the locking arms 112, 114 to move into opened and closed positions for engaging and disengaging the latching ring 102 from a cable connector. The hinging action is made possible because the walls of the latching ring 102 are thinned or notched sufficiently to form the notches 108, 110, which enables the locking arms 112, 114 of the ring to flex or bend at the notch locations. It should be noted that actual hinges or other hinging systems also may be used. Alternatively, materials and corresponding dimensions may be chosen that do not require a notch or hinge and instead rely on the flexibility of the materials to provide functionality similar to that described above.

Figure 3:
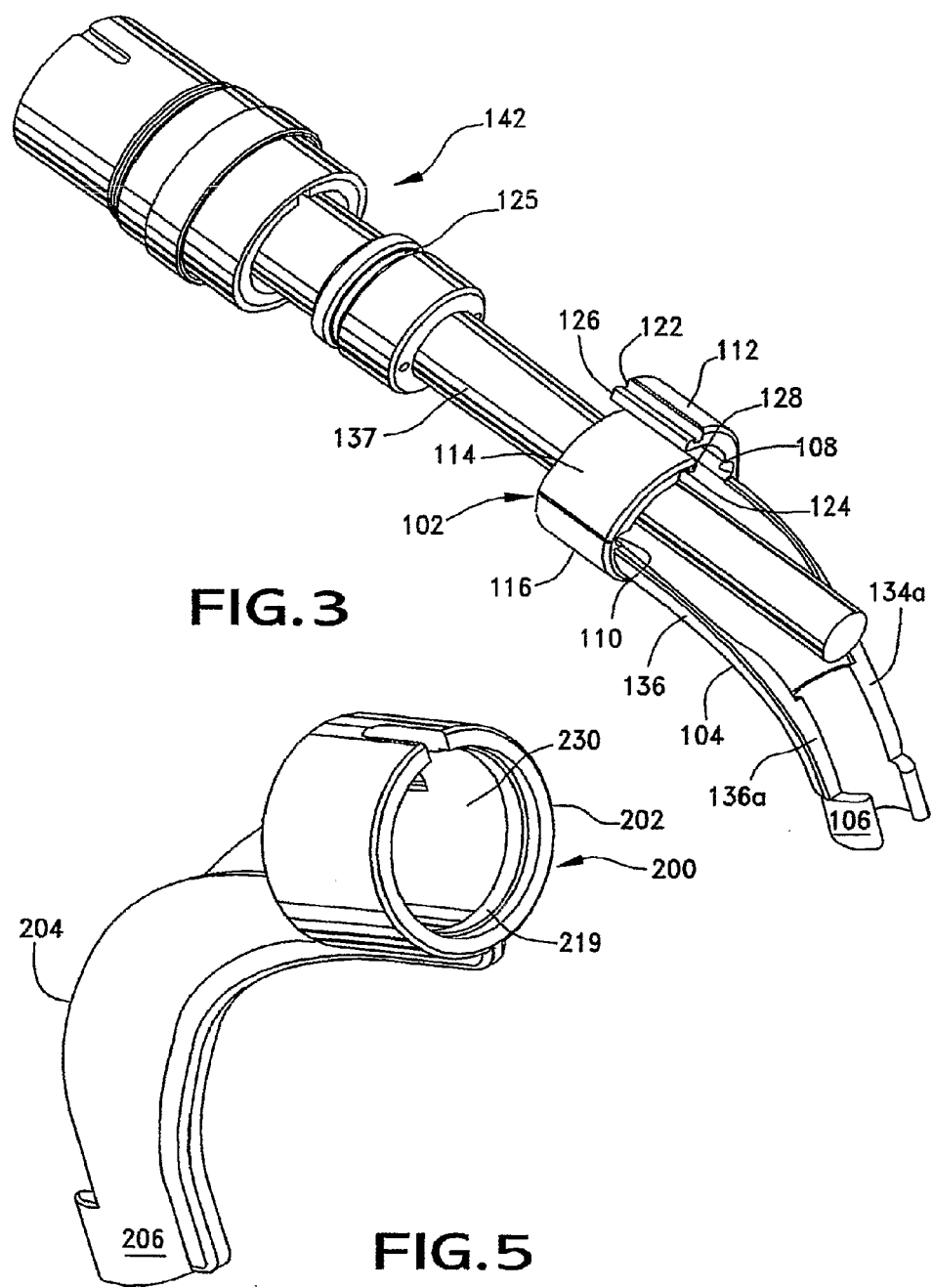
FIG. 3 is a rear perspective view of the described fiber optic bend limiter system of FIG. 1 engaging a complementary connector.

The inner side 130 of the latching ring 102 is formed with one or more outwardly extending flanges 119 that are sized and shaped to engage a complementary groove 125 on a cable connector 142 (FIG. 3). Fewer or greater flanges may be included as necessary, or a single flange may be formed around the entire inside perimeter. It is to be noted that the size and shape of the flange 119 depends on the configuration and dimension of the particular connector being used and may be varied during manufacture of the bend limiting system 100.

As shown, the cable guide 104 portion extends outwardly from the base 116 of the latching ring portion 102 at a predetermined angle. The chosen angle ideally provides the minimum bend radius below which the cable should not be bent. In addition, the stiffness of the materials used in manufacturing the bend limiter 100 along with a reinforcement member 138 helps maintain the required bend radius. Of course, the cable guide 104 may be manufactured at a variety of bend radiuses depending on the diameter or other critical factor of the fiber optic cable being inserted into the bend limiter.

Figure 4:
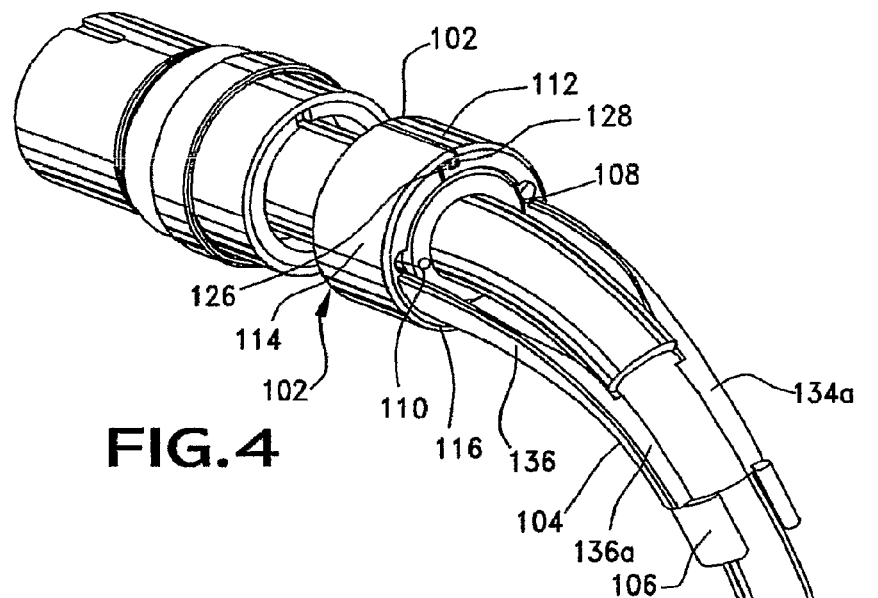
FIG. 4 is a rear perspective view of the described fiber optic bend limiter system of FIG. 1 in a fully engaged configuration.

The cable guide 104 is formed with a rounded passage 132 extending from the base 116 of the ring portion 102 all the way through to the cable retainer 106. The cable guide 104 in the exemplary embodiment is formed with curved sidewalls 134, 136 for securely receiving and retaining a round cable 137 (FIG. 4). It should be noted that the passage 132 and sidewalls 134, 136 may be varied in shape and size depending on the particular application and shape of cable being used. For example, as shown in FIGS. 2 and 3, the cable guide portion 104 may be divided into two sections. The first section is sized to enable the cable 137 to move freely within the cable guide 104. The second section is somewhat narrower so that the cable 137 may be held in position by the walls 134, 136 of the cable guide 104. The narrower section is formed by extending the sidewalls 134, 136 inwardly to form a set of flaps 134a, 136a. These flaps then act as clamps to prevent the cable 137 from coming out of the cable guide 104. The size and shape of the sidewalls 134, 136 may be varied to work best with the particular size and shape of the cable and its connector.

The outwardly extending end of the cable guide 104 terminates at the cable retainer 106. The cable retainer 106 is generally formed in the shape of a ring, but has an opening or mouth 140 through which the cable 137 is inserted. In the illustrated exemplary embodiment, the width and curvature of the retainer 106 is sized such that the sides or walls of the retainer 106 expand slightly outwardly as the cable is pushed past the mouth 140. Once the cable 137 is in position, the walls return to their normal positions. This allows the retainer 106 to engage and securely hold the cable 137 generally immovably in place.

In operation, as shown in FIGS. 3 and 4, the locking arms 112, 114 are separated so that the connector 142 or cable 137 can be inserted within the latching ring portion 102. Once inserted, the bend limiter 100 is slid into its appropriate position where the latching arms 112, 114 encircle the connector 142. The locking arms 112, 114 are then brought together so that the foot 126 of the first locking arm 112 engages the trench 124 of the second locking arm 114 and the foot 128 of the second locking arm 114 engages the trench 122 of the first locking arm 112. The trenches 122, 124 and the feet 126, 128 are sized and shaped so as to create either a snap-fit or friction-fit engagement between the two locking arms to prevent them from inadvertently separating.

The cable 137 is then pressed into the trench portion of the cable guide 104. The cable 137 is then clamped into the bottom portion of the cable guide 104 using the flaps 134a, 136a. Finally the cable 137 is passed through the opening 140 and becomes removably locked into the cable retainer 106.

It should be noted that the shape and size of the bend limiter 100 may be altered to fit non-circular type connectors as well. Furthermore, the bend limiter 100, for ease of manufacturing and cost considerations is preferably manufactured as a one-piece unit using a substantially rigid material such as plastic, although other materials such as metals may be used.

In another aspect (not shown), the latching ring 102 may be configured with other latching systems. For example, the arms 112, 114 may be configured with one or more additional trenches. This enables the radius of latching ring 102 to be varied in circumference to accommodate connectors of different sizes. In still another aspect, the latching system may be external to the latching ring 102. For example, a lockable strap or tie may be wrapped around the exterior of the latching ring 102.

Figure 6:
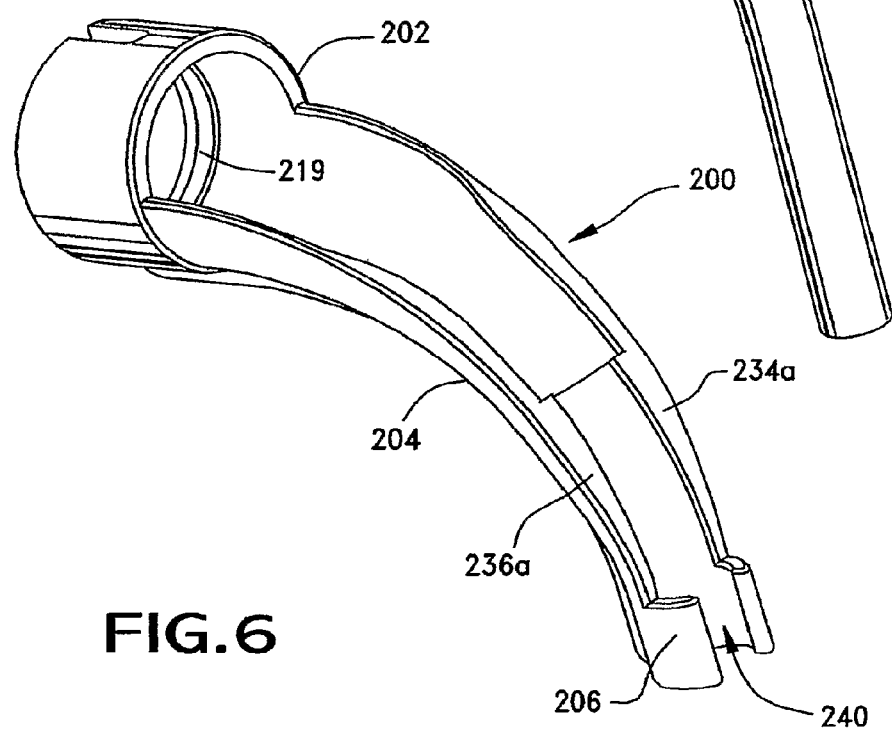
FIG. 6 is a rear perspective view of the described fiber optic bend limiter system of FIG. 5.

Turning now to FIGS. 5 and 6, a second exemplary embodiment of the bend limiter is shown. Although substantially similar in design to the bend limiter 100 described above, this second embodiment of the bend limiter 200 includes a latching ring 202 that is continuous and can not be opened. A particular advantage of the continuous latching ring 202 is that even very strong cable pull forces will not cause the bend limiter 200 to open up or come undone. In this configuration, the latching ring 202 is sized to fit over and around the cable connector 242.

Figure 7:
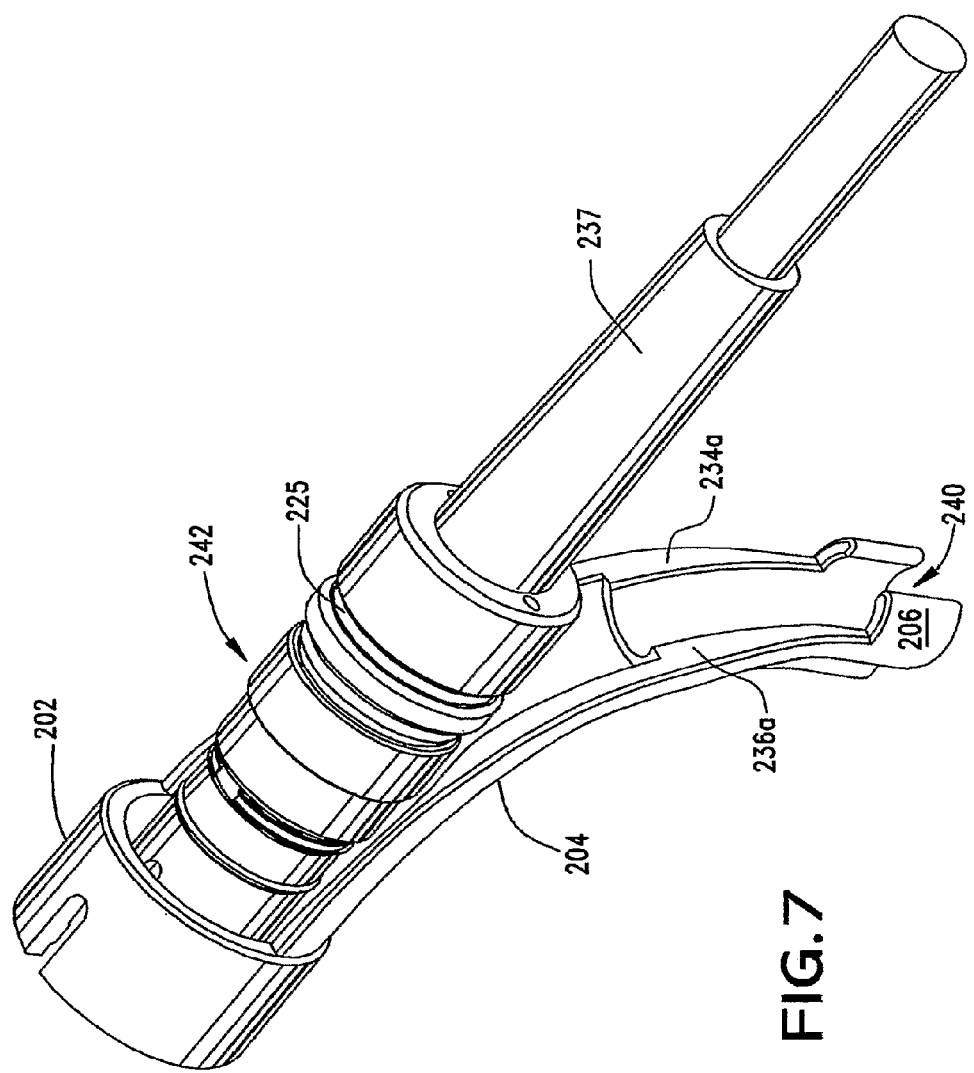
FIG. 7 is a rear perspective view of the described fiber optic bend limiter system of FIG. 1 engaging a complementary connector.
Figure 8:
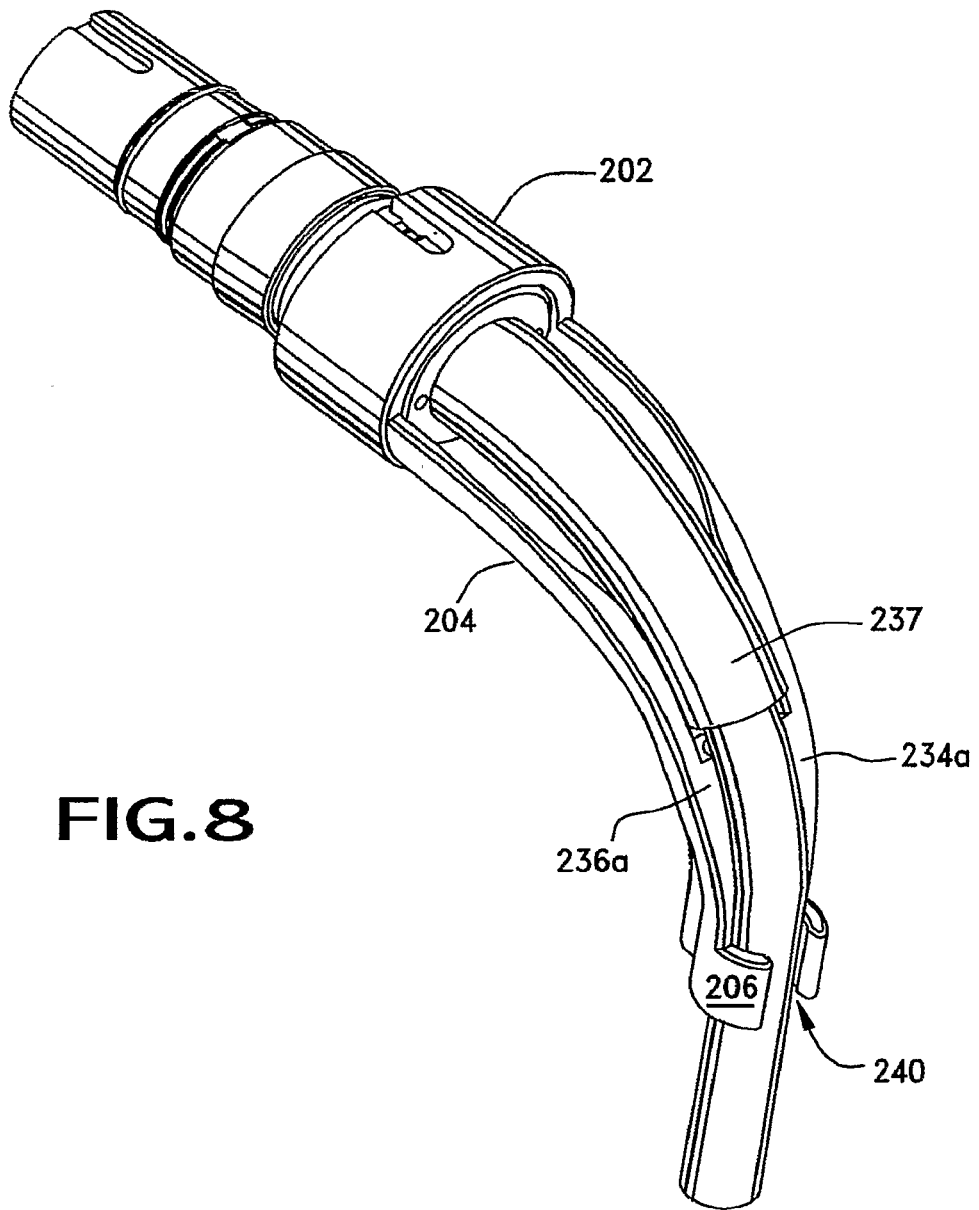
FIG. 8 is a rear perspective view of the described fiber optic bend limiter system of FIG. 1 in a fully engaged configuration.

The inner side 230 of the latching ring 220 includes a single outwardly extending flange 219 that continuously runs the entire interior of the latching ring 220. The flange 219 engages a complementary groove 225 on a cable connector 242 for securely holding the flange in place against the cable connector. It should be noted that the configuration of the latching ring 202 and the flange 219 may be varied during design and manufacture to accommodate various cable connector designs. The cable guide 204 and cable retainer 206 portions are substantially identical to their counterparts described above In operation, as shown in FIGS. 7 and 8, the cable connector 242 is inserted into the latching ring 202 from the back side. The cable connector 242 is pushed through the latching ring 202 until the flange 219 (FIGS. 5 and 6) engages the ridge 225 of the cable connector 242.

The cable 237 is then pressed into the trench portion of the cable guide 204 and is then clamped into the bottom portion of the cable guide 204 using the flaps 234a, 236a. Finally the cable 237 is passed through the opening 240 and becomes removably locked into the cable retainer 206.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A strain relief system, the strain relief system comprising:
   a latching ring entirely surrounding a cable connector, the latching ring including front and rear ends for retrofittably engaging the cable connector and at least one flange extending from an inner surface thereof and configured to engage the cable connector from an end of a mating face of the cable connector so that the mating face extends outwardly from the front end of the latching ring; and
   a guide portion, the guide portion including front and rear ends, the front end of the guide portion being connected to the rear end of the cable connector, configured to guide a fiber optic cable extending out of the rear end of the cable connector, at least partially curved through an angle along a length thereof that does not violate the minimum bend radius of the fiber optic cable, and open at a top side thereof.

2. The strain relief system of claim 1, wherein the open top side of the guide portion defines a channel along its length, sized to allow the insertion of a cable.

3. The strain relief system of claim 2, further comprising a retainer for releasably locking the fiber optic cable within the channel.

4. The strain relief system of claim 1, wherein the latching ring further includes separable first and second arms for creating an opening therebetween when the arms are separated.

5. The strain relief system of claim 4, wherein the separable first and second arms include a latching mechanism for locking the arms together.

6. The strain relief system of claim 1, wherein the latching ring is a single inseparable continuous ring.

* * * * *